United States Patent [19]

Rutter

[11] Patent Number: 4,835,962
[45] Date of Patent: Jun. 6, 1989

[54] FUEL ATOMIZATION APPARATUS FOR GAS TURBINE ENGINE

[75] Inventor: Stephen D. Rutter, Stratford, Conn.

[73] Assignee: Avco Corporation, Providence, R.I.

[21] Appl. No.: 884,737

[22] Filed: Jul. 11, 1986

[51] Int. Cl.$^4$ ................................................ F02C 1/00
[52] U.S. Cl. ..................................... 60/737; 60/39.141
[58] Field of Search ................... 60/39.141, 737, 739, 60/740, 741, 742; 239/419, 533.2

[56] References Cited

U.S. PATENT DOCUMENTS

| | | | |
|---|---|---|---|
| 2,836,036 | 5/1958 | Drage | 60/39.141 |
| 3,056,257 | 10/1962 | Brunkhardt | 60/39.141 |
| 3,426,527 | 2/1969 | O'Connor | 60/39.141 |
| 4,589,260 | 5/1986 | Krockow | 60/737 |

Primary Examiner—Louis J. Casaregola
Assistant Examiner—Timothy S. Thorpe
Attorney, Agent, or Firm—Perman & Green

[57] ABSTRACT

An apparatus is provided for use in a gas turbine engine to achieve an efficient atomization of fuel over a wide range of fuel flow rates and engine operating conditions. The apparatus comprises a valve to selectively block the flow of fuel directed to the fuel injector of the engine during the start-up conditions of the engine. The valve, however, will permit the fuel to flow through a mixing apparatus during start-up conditions. The mixing apparatus includes a nozzle into which the fuel is directed. The mixing apparatus also is in communication with a supply of air. The pressure drop created as the fuel passes through the nozzle will draw air into the apparatus and effect mixing of fuel and air. Subsequent passage of the fuel/air mixture through the relatively large passages of the conventional fuel injector will effect good atomization even at low fuel flow rates associated with start-up conditions.

4 Claims, 3 Drawing Sheets

FUEL ATOMIZATION APPARATUS FOR GAS TURBINE ENGINE

BACKGROUND OF THE INVENTION

Gas turbine engines operate by directing a flow of combustion gases through alternating arrays of stationary and rotating blades. The combustion gases which perform the work in the engine are generated in the combustor by burning fuel in the presence of compressed air.

Proper combustion requires good dispersion or atomization of the fuel in the combustor to ensure proper mixing with the compressed air. This efficient atomization of fuel must be effective over a wide range of fuel flow rates which reflect the wide range of engine operating conditions.

At the relatively high fuel flow rates which occur during most engine operating conditions, a significant pressure differential exists across the outer wall of the combustor. This significant pressure differential and the relatively high flow rates can be utilized to achieve a desirable atomization of the fuel. However, at extremely low engine operating speeds, such as the speeds occurring during start-up conditions, the fuel flow rates are low and the pressure differential across the wall of the combustor is also low. Consequently it has been difficult to obtain the required atomization when the engine is being started.

Many attempts have been made to develop an apparatus to achieve the required fuel atomization during a wide range of engine operating conditions. One such apparatus has been a duplex fuel injector mounted in the wall of the combustor. The duplex fuel injector includes a very small primary fuel aperture and a larger secondary fuel aperture both of which are in the combustor. The primary fuel aperture typically has a diameter of between 0.01 inch and 0.10 inch. Both the primary and secondary fuel apertures are in communication with a flow divider valve which is operable to selectively atlernate flows between the primary and secondary fuel apertures. More particularaly, the flow divider valve is operative to direct fuel to the primary fuel aperture during engine start-up conditions. The rate of flow of fuel during these conditions is relatively low, in accordance with the engine operating requirements. However, since the primary fuel aperture is very small, the required atomization can be achieved even with low fuel flow rates. As the engine operating speeds and fuel requirements increase, the flow divider valve will change modes to direct fuel from the primary fuel aperture to the larger secondary fuel aperture. As noted above, the higher fuel flow rates occurring in during most post start-up conditions, combined with the pressure differential across the combustor wall, will enable an efficient atomization of fuel.

Although the above described duplex fuel injector is theoretically functional, several problems have been encountered during the actual use of the apparatus. More particularly, the prior art duplex fuel injector is mounted such that both the primary and secondary fuel apertures are within the engine combustor. The combustion processes taking place within the combustor generate very high temperatures (e.g. 4,000° F.) and generate various combustion by-products. As a result of these extreme conditions, the very small primary fuel aperture is likely to become at least partly blocked due to coking or varnishing. This blockage of the primary fuel aperature may cause significant problems in connection with the starting of the engine.

In view of the above, it is an object of the subject invention to provide an apparatus for achieving a desirable atomization of fuel across a wide range of engine operating conditions.

It is another object of the subject invention to provide an apparatus that enables the use of a fuel injector in the combustor that is not likely to be blocked by coking.

It is an additional object of the subject invention to provide an apparatus that can achieve adequate atomization at low fuel flow conditions without employing a small fuel aperture in the combustor.

It is another object of the subject invention to provide an apparatus that is spaced from the combustor, and that is operative to create an efficient atomization of fuel during engine start-up conditions.

SUMMARY OF THE INVENTION

The subject invention is directed to an apparatus that is selectively operable to create a pressure drop in the fuel delivery system. The pressure drop enabled by the apparatus can create efficient atomization at low fuel flow rates without resorting to the small primary fuel aperture of the prior art duplex fuel injectors. Furthermore, the apparatus of the subject invention can be spaced from the combustor, and thus is not subject to high temperature and coking.

The apparatus of the subject invention employs a valve means in communication with the main fuel supply line. The valve means is operative to divert fuel from the main fuel supply line.

A mixing nozzle is in communication with the valve means and receives the fuel diverted from the main fuel supply line. The mixing nozzle defines a cross sectional area considerably smaller than the cross sectional area of the fuel supply line. As a result of this smaller area, the fuel passing therethrough undergoes a proportionally significant pressure drop.

A mixing chamber is in communication with the mixing nozzle and receives the fuel therefrom. The mixing chamber also is in communication with a source of air.

The drop in fuel pressure across the mixing nozzle entrains air in the mixing chamber. This entrainment is attained with the low fuel flow rates because of the pressure drop created as the fuel passes through the mixing nozzle.

The dispersion of air and fuel then is further directed from the mixing chamber to the combustor. Because of the entrained air, the mixture can be directed into the combustor through a fuel injector aperture comparable in size to the secondary aperture of the prior art duplex fuel injector. Thus, there is no need to employ a small primary aperture to create the atomization at the wall of the combustor, and the potential for coking or other blocking of the small prior art primary aperture is completely avoided.

Although the above described apparatus achieves proper atomization during start up conditions, the flow rates through the mixing nozzle of the apparatus are not sufficient for most post-start-up engine operating conditions. Therefore, it also is necessary to provide a means for delivering greater amounts of fuel to the fuel injector.

In one embodiment of the invention the valve means is operative to direct all fuel through the mixing nozzle during engine start-up conditions. As the engine requires more fuel, however, the valve means will permit the flow of fuel directly to the fuel injector. The valve means may be operative to either shut off the flow of fuel through the mixing nozzle, or to allow fuel to pass simultaneously through both the mixing nozzle and the main fuel supply.

Another embodiment of the subject invention includes a valve in communication with both the fuel supply line and the line of combustor air directed into the mixing chamber. This valve will alternately allow either combustor air or fuel to enter the mixing chamber in accordance with the relative pressures of each. For example, during engine start-up conditions the fuel flow rate will be low. Consequently the force of the combustor air will urge the valve into a condition where fuel will not flow into the mixing chamber, but where combustor air will flow into the mixing chamber. As fuel flow rates are increased to achieve greater engine speeds, the fuel pressure will exceed the pressure exerted by the combustor air going to the mixing chamber. Consequently, the fuel pressure will gradually move the valve into its opposite mode to enable increasingly greater volumes of fuel into the mixing chamber. Although this greater volume of fuel directed to the mixing chamber will decrease the amount of atomization in the mixing chamber, these engine operating and fuel flow conditions will cause a greater pressure drop across the combustor liner, thereby enabling efficient atomization by known techniques using an aperture in the combustor sufficiently large to avoid coking or other blockages.

The valves to alternatively stop or direct the flow of fuel through the main fuel supply line can be operated either by the relative pressures of fuel and combustor air or by various electrical, mechanical, pneumatic or hydrostatic means.

DETAILED DESCRIPTION OF THE PREFERRED EMBODIMENT

Figure 1:
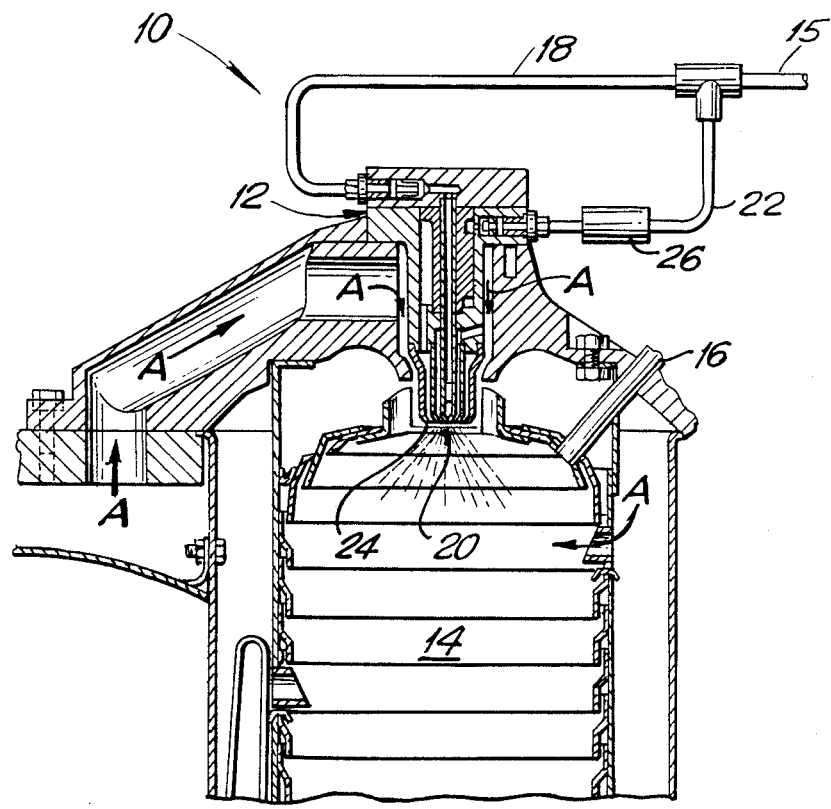
FIG. 1 is a schematic view of a prior art fuel delivery system to a combustor.

The prior art fuel delivery system for a gas turbine engine is indicated generally by the numeral 10 in FIG. 1. The prior art fuel delivery system 10 includes a duplex fuel injector 12 that is operative to deliver a controlled amount of fuel to the combustor 14. More particularly, in the prior art system, fuel is delivered through fuel supply line 15 to the duplex fuel injector 12 in accordance with a complex schedule that is a function of many variables, including instructions delivered through cockpit controls, temperature, altitude and such. The fuel is mixed in the combustor 14 with compressor discharge air indicated generally by the arrows "A" in FIG.1. This fuel/air mixture is combusted in response to sparks initiated by spark plug 16. The resulting combustion gases are then directed to and impinge upon the rotating arrays of turbine blades to create the energy for operating the compressor and for engine thrust.

The fuel directed to the combustor 14 must be properly atomized to achieve a sufficiently complete combustion. During most engine operating conditions, a high fuel flow rate is required and a significant pressure differential exists across the wall of the combustor 14. The fuel flow rate and the pressure differential enable a sufficient atomization of fuel to be carried out using well known techniques and structures. However, during engine start-up conditions, the fuel flow rate is low and the pressure differential across the wall of combustor 14 also is low. Consequently, the prior art gas turbine engine utilized the fuel delivery system illustrated schematically in FIG. 1 to achieve atomization.

Central to the prior art fuel delivery system 10 was the duplex fuel injector 12. More particularly, the prior art duplex fuel injector 12 includes a primary fuel delivery line 18 in communication with a primary fuel aperture 20. The prior art duplex fuel injector 12 further includes a secondary fuel delivery line 22 in communication with a secondary fuel aperture 24. The primary fuel aperture 20 typically is between 0.1 and 0.01 inch in diameter, while the secondary fuel aperture 24 is substantially larger. The precise dimensions, of course, would depend upon various engine characteristics.

The prior art fuel delivery system 10 further includes a flow divider valve 26 which is operative to selectively stop the flow of fuel to the secondary fuel aperture 24 of the duplex fuel injector 12. More particularly, the flow divider valve 26 is operative to stop the flow of fuel to the secondary fuel aperture 24 during engine start-up conditions. Consequently, the entire flow of fuel during a start-up condition would be directed to the primary fuel line 18 and through the small primary fuel aperture 20. The small size of the primary fuel aperture 20 theoretically enables a desirable and efficient atomization of the fuel in the combustor 14 and thereby achieves a sufficient mixture of fuel with the compressed air, and a correspondingly complete combustion. As the fuel demands of the engine increase, the flow divider valve 26 permits the flow of fuel through the secondary fuel line 22 and into the combustor through the secondary fuel aperture 24. The greater pressure differential existing across the wall of combustor 14 during these higher power conditions enables the required atomization.

As explained above, the small primary fuel aperture 20 of the prior art system 10 was subject to blockage due to coking and other combustion related phenomena occurring in the combustor 14. Blockage of the secondary fuel aperture 24 was not likely to occur because of the substantially greater size of the secondary fuel aperture 24.

Figure 2:
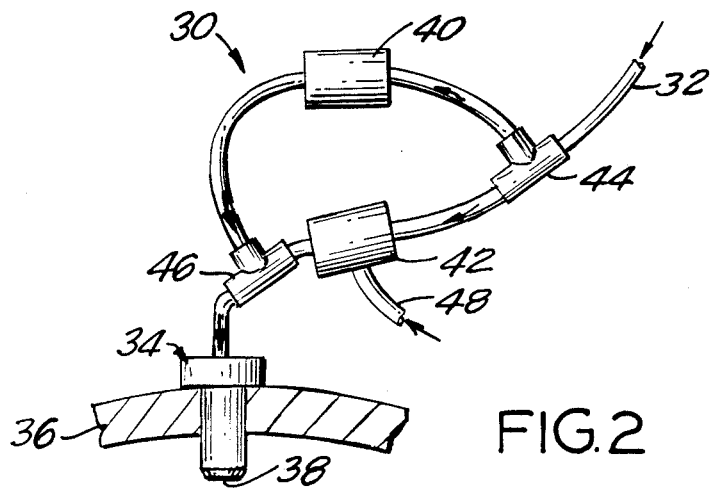
FIG. 2 is a schematic view of the fuel delivery system of the subject invention.

The fuel delivery system of the subject invention is illustrated schematically in FIG. 2 and is referred to generally by the numeral 30. The fuel delivery system 30 includes a fuel line 32 which is in communication with a fuel injector 34. The fuel injector 34 in turn is mounted to the combustor 36. The fuel injector 34 includes a single fuel aperture 38 which is operative to direct an atomized spray of fuel into the combustor under sufficiently high fuel flow rates and sufficiently great pressure differentials across the liner of combustor 36.

The fuel delivery system 30 further includes a valve means 40 and a mixing means 42, both of which are in communication with the fuel line 32. The valve means 40 is operative to selectively control the proportion of fuel passing through the mixing means 42. As illustrated in FIG. 2, the valve means 40 and the mixing means 42 both are in communication with the fuel injector 34. The mixing means 42 also is in communication with a source of air through line 48. In this embodiment, when valve means 40 is in an open mode, fuel will flow through both the valve means 40 and the mixing means 42. On the other hand, the entire flow of fuel can be directed through the mixing means 42 by selectively placing the valve means 40 in a closed mode.

As explained in greater detail below, the valve means 40 is operative to direct all fuel through the mixing means 42 during start-up conditions. The mixing means 42, in turn, is constructed to create a significant pressure drop therein. This drop of pressure in the fuel entering mixing means 42 entrains air flowing through line 48. This fuel and entrained air will then continue to flow toward the fuel injector 34 which will efficiently atomize the fuel and entrained air even at low flow rates associated with engine start-up conditions.

The gas turbine engine will generate more energy and will require correspondingly greater amounts of fuel as it passes through the start-up condition. There will also be a greater pressure differential across the wall of combustor 36. As these operating conditions approach, the valve means 40 will change from the closed mode to the open mode, and thereby will permit the greater flow of fuel to the fuel injector 34. The fuel that bypasses the mixing means 42 will not carry entrained air as it approaches the fuel injector 34. However, the fuel flow and pressure conditions will be such that the fuel can be appropriately atomized at fuel aperture 38 by known atomization structures and techniques. Additionally fuel aperture 38 is sufficiently large to prevent coking.

The volume of fuel and air flowing through the fuel mixing means 42 is small compared to the volume of fuel directed to the fuel injector 34 during conditions of high power. Consequently, the fuel delivery system 30 can be constructed to either permit the continuous flow of fuel through fuel mixing means 42 or the selective termination of flow through fuel mixing means 42 during high energy conditions. In this regard, the embodiment of fuel delivery system 30 shown in FIG. 2 permits the flow of fuel through mixing means 42 at all times. As an alternative to this embodiment, the valve means 40 could be replaced by a valve either at T-connection 44 or T-connection 46. These optional constructions could selectively terminate flow through mixing means 42.

Figure 3:
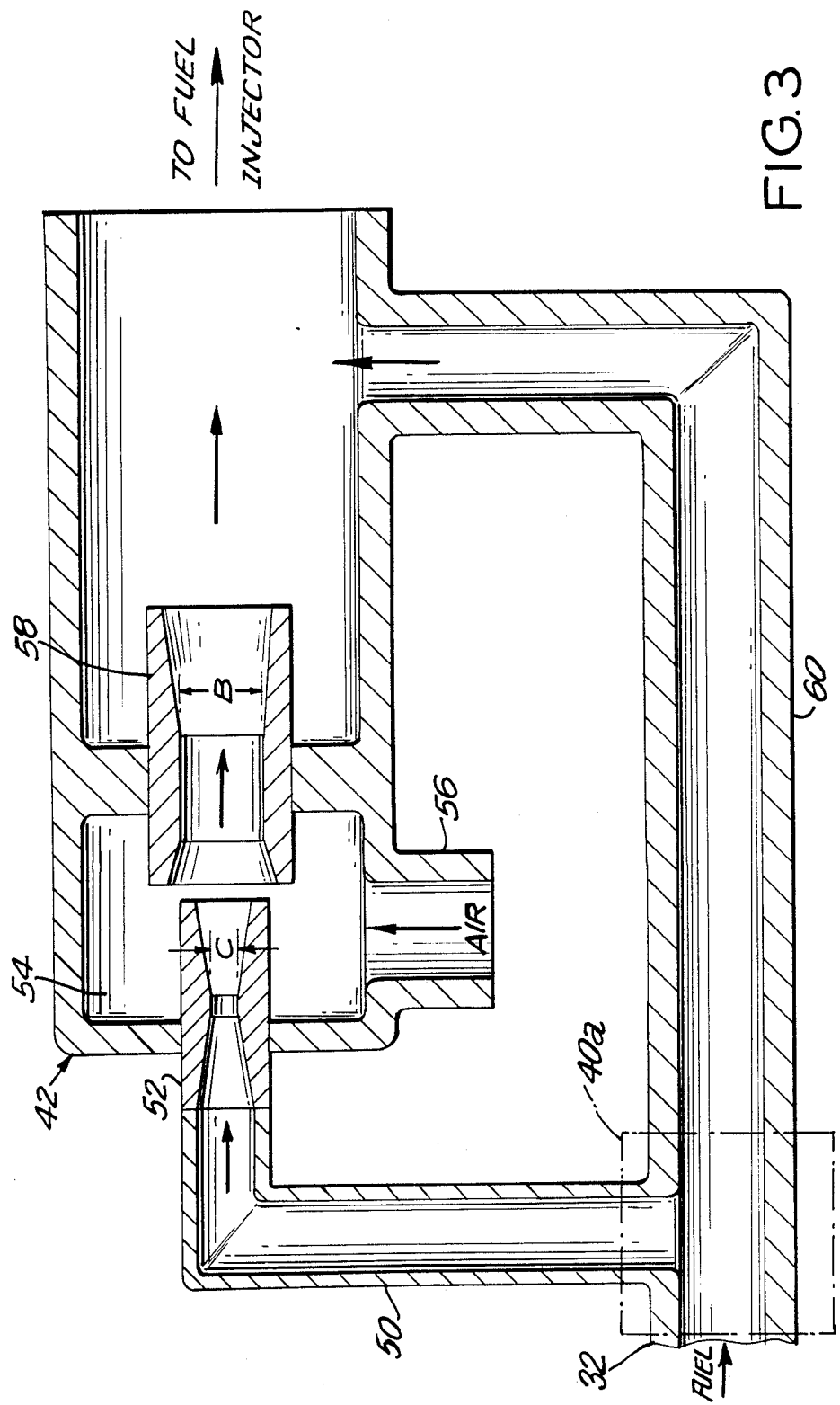
FIG. 3 is a cross sectional view of the atomization apparatus of the subject invention.

One preferred construction of the valve and atomization means 40a and 42 is shown in FIG. 3. In this embodiment, the fuel passing through fuel line 32 must pass through valve 40a before going to either the mixing means 42 or the fuel injector (not shown). More particularly, start-up fuel line 50 extends from valve 40a to a first nozzle 52 of mixing means 42. The first nozzle 52 is provided with a diameter "a" which is sufficiently small to create a substantial pressure drop and high velocity in the fuel passing therethrough during start-up conditions of the engine. The first nozzle 52 directs the fuel into a mixing chamber 54 of the mixing means 42. The mixing chamber 54 of mixing means 42 also is in communication with compressor discharge air through line 56. The pressure drop created across the wall of the mixing means 42 draws the air into the mixing chamber 54. This fuel/air mixture then is directed through second nozzle 58 where the total pressure is recovered. The fuel/air mixture then is directed toward the fuel injector (not shown) and enters the combustor with the air sufficiently pressurized to achieve good atomization and efficient and substantially complete combustion even at start-up conditions.

As the engine advances toward higher power conditions, the valve means 40 is operated to direct fuel through main fuel line 60 and around the mixing means 42. The valve means 40 can be, operative to terminate the flow through start-up line 50 when the flow through main fuel line 60 commences. Alternatively, the valve means 40 can be operative to selectively start or stop the flow through main fuel line 60 while maintaining a continuous flow through the start-up line 50.

Figure 4:
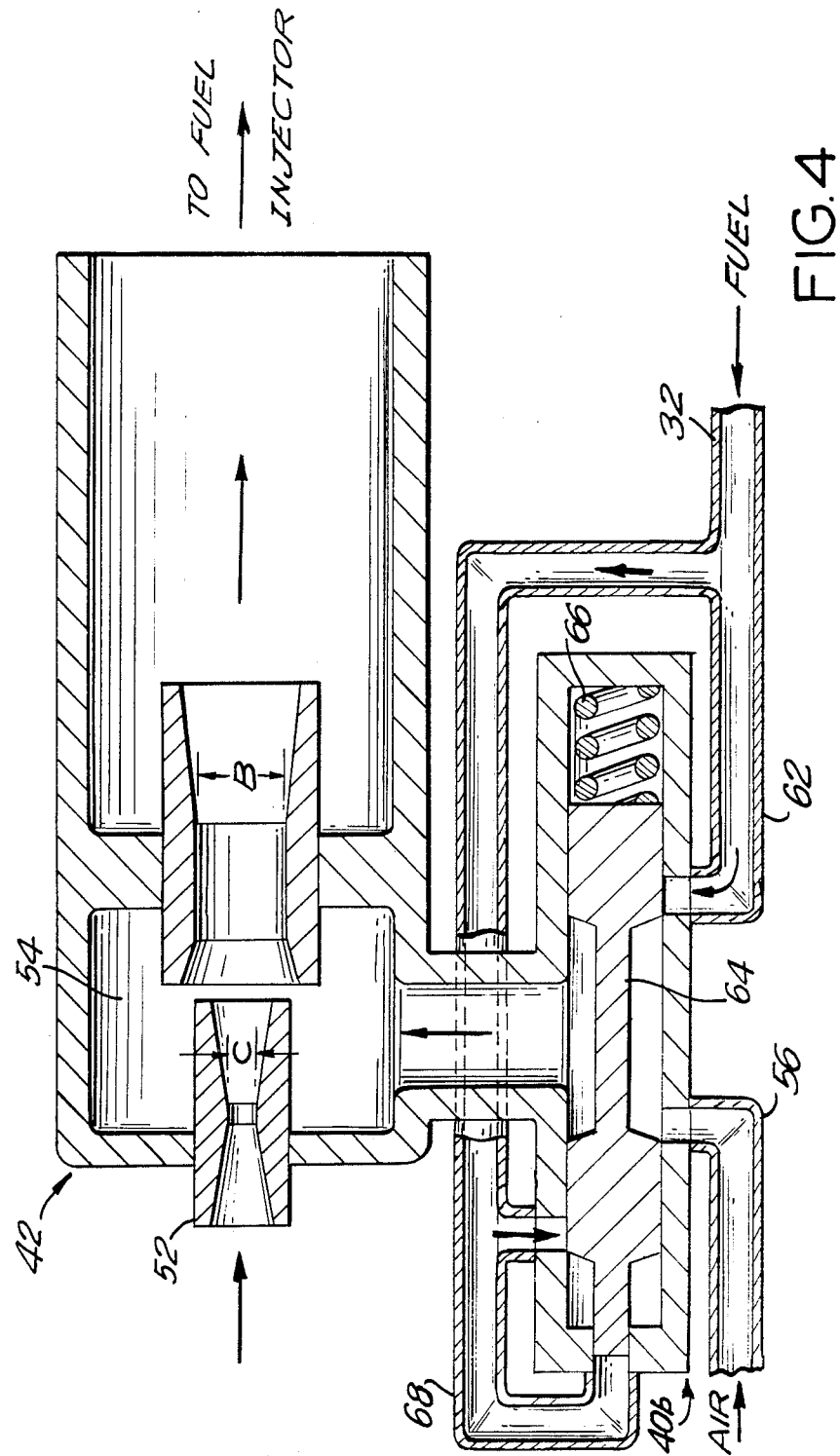
FIG. 4 is a cross sectional view of a second embodiment of the atomization apparatus of the subject invention.

Alternate embodiments of the valve and atomization means 40b and 42 are shown in FIG. 4. In the embodiment, fuel is directed through the first nozzle 52 and into mixing chamber 54 during all engine operating conditions. As explained above, the area "a" of nozzle 52 is selected to achieve a pressure drop that will ensure sufficient atomization of fuel during start-up conditions.

The valve means 40b shown in FIG. 4 is operative to direct either air or fuel into the mixing chamber 54 depending upon the rate of flow of fuel. More particularly, the valve means 40b is in communication with air line 56 and with fuel line 62. The valve means 40b is further in communication with blocking means 64 which is movable therein. In a first position, as shown in FIG. 4, the blocking means 64 is operative to block the flow of fuel through fuel line 62 into the mixing chamber 54. In this first position, the blocking means will permit the flow of air through line 56 and into the mixing chamber 54. A second position of blocking means 64 exists when the blocking means 64 is shifted to the right of the position shown in FIG. 4. In this second position, air will be blocked from the mixing chamber 54 while fuel will be able to flow into the mixing chamber 54.

The blocking means 64 is in communication with biasing means 66 which is operative to urge the blocking means 64 into its first position, as shown in FIG. 4, where air may flow freely into the mixing chamber 54 through line 56, but where the flow of fuel through valve 40b is blocked. The valve means 40b further includes fuel line 68 which is in communication with fuel line 32 and with a portion of blocking means 64. More particularly, the fuel line 68 is disposed such that the flow therein will exert forces on the blocking means that are generally opposed to the forces exerted by the biasing means 66. Consequently, as the fuel flow rates increase in response to the increasing demands of the engine, the forces exerted on blocking means 64 also will increase. At a selected level of fuel flow, the forces exerted on the blocking means by the fuel will be sufficient to overcome the forces exerted by the biasing means 66. As a result, the blocking means 64 will move into its second position thereby allowing fuel to flow through line 62, into and through the valve 40b and finally into the mixing chamber 54.

As the proportion of air flowing into the mixing chamber 54 gradually decreases, the degree of atomization created in mixing chamber 54 also will decrease. Eventually, there will be no atomization taking place in the mixing chamber 54. However, as the fuel flow rate into and through the atomization chamber increases, the pressure drop across the wall of the combustor also will increase and the atomization will take place at the fuel injector using known techniques.

In summary, a fuel delivery system is provided to enable efficient atomization of fuel over a wide range of engine operating conditions. The fuel delivery system comprises a valve means and mixing means both of which are spaced from the combustor and are not subject to coking and other combusted related problems. The valve means is operable to selectively block the flow fuel directly to the fuel injector. Fuel that is not flowing directly to the fuel injector passes first through the mixing means. The mixing means includes a nozzle that directs fuel into a mixing chamber and that is operative to create a pressure drop. The mixing chamber also is in communication with a source of air. The pressure drop draws air into the mixing chamber and creates a sufficient amount of atomization even at the low flow rates associated with start-up conditions. This mixture of fuel and air will be atomized in the relatively large aperture of a conventional fuel injector. As the engine passes through its start-up condition, greater volumes of fuel will be directed to the combustor. As these conditions approach, the valve means will be operated to urge at least a portion of the fuel directly to the fuel injector. During these conditions, the fuel flow rates and the pressure differentials across the combustor liner will be sufficient to enable the relatively large diameter aperture of the fuel injector to create atomization within the chamber without creating a risk of coking or other such combustion related phenomena that could block the flow of fuel.

While the invention has been described with respect to preferred embodiments, it is apparent that various modifications can be made thereto without departing from the spirit of the invention as defined by the appended claims.

What is claimed is:

1. A fuel delivery assembly for a gas turbine engine, said engine comprising a source of fuel, a source of air and a combustor in communication with said sources of fuel and air, said fuel delivery assembly comprising:
    a fuel injector mounted to said combustor and in communication with said sources of fuel and air, said fuel injector being provided with aperture means for creating an atomized dispersion of fuel and air in the combustor at rates of flow of fuel at or above a preselected rate;
    a main fuel supply line for providing a first means of communication between said source of fuel and said fuel injector;
    a bypass fuel line providing a second means of communication between said source of fuel and said fuel injector; a nozzle is communication with said bypass fuel line for producing a drop in pressure of fuel passing therethrough;
    a mixing chamber in communication with said nozzle and disposed in said bypass fuel line intermediate said nozzle and said fuel injector, said mixing chamber being in communication with said source of air for creating a dispersion of air and fuel therein from said source of air and fuel passing through said nozzle ; and
    valve means in communication with said main fuel line for selectively blocking the flow of fuel therethrough at fuel flow rates below the preselected rate and directing the fuel through said bypass fuel line.

2. A fuel delivery assembly as in claim 1 where said nozzle is spaced from the combustor.

3. A fuel delivery assembly as in claim 1 wherein said valve means is in communication with said source of air and with said mixing chamber, said valve means being movable in response to fuel flow rates, such that at fuel flow rates equal to or greater than the preselected level, said valve means is movable to one position to block the flow of air from said source of air to said mixing chamber and to permit the flow of fuel to said mixing chamber and such that at fuel rates below the preselected level said valve means is movable to another position to block the flow of fuel to said mixing chamber and to permit the flow of air thereto.

4. A fuel delivery assembly as in claim 3 wherein said valve means includes blocking means for alternately blocking the flow of fuel or the flow of air, and biasing means for urging said blocking means into a position to block the flow of fuel into said mixing chamber at fuel flow rates below the preselected rate.

* * * * *